(12) United States Patent
Washburn et al.

(10) Patent No.: US 7,509,343 B1
(45) Date of Patent: Mar. 24, 2009

(54) SYSTEM AND METHOD OF COLLECTING AND REPORTING SYSTEM PERFORMANCE METRICS

(75) Inventors: Brian John Washburn, Kansas City, MO (US); Brian Paul Farrell, Shawnee Mission, KS (US); Margaret M. Mcmahon, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 575 days.

(21) Appl. No.: 10/863,940

(22) Filed: Jun. 9, 2004

(51) Int. Cl.
G06F 17/30 (2006.01)
G06F 17/00 (2006.01)

(52) U.S. Cl. .................. 707/104.1; 707/1; 707/3; 707/10; 707/100; 707/205

(58) Field of Classification Search ............ 707/1, 707/3, 10, 100, 104.1, 205
See application file for complete search history.

(56) References Cited

U.S. PATENT DOCUMENTS

| | | | | |
|---|---|---|---|---|
| 5,745,888 A * | 4/1998 | Bauer et al. ................. 707/1 |
| 5,745,902 A * | 4/1998 | Miller et al. ............... 707/200 |
| 5,905,868 A * | 5/1999 | Baghai et al. .............. 709/224 |
| 6,035,396 A * | 3/2000 | Thompson et al. ............ 713/2 |
| 6,148,335 A * | 11/2000 | Haggard et al. ............ 709/224 |
| 6,167,358 A * | 12/2000 | Othmer et al. ............. 702/188 |
| 6,449,739 B1 * | 9/2002 | Landan ..................... 714/47 |
| 6,564,228 B1 * | 5/2003 | O'Connor .................. 707/200 |
| 6,584,582 B1 * | 6/2003 | O'Connor .................... 714/21 |
| 6,643,613 B2 * | 11/2003 | McGee et al. ............... 702/186 |
| 6,708,137 B2 * | 3/2004 | Carley ...................... 702/179 |
| 6,775,823 B2 * | 8/2004 | MacDonell ................ 717/124 |
| 6,892,236 B1 * | 5/2005 | Conrad et al. .............. 709/224 |
| 7,069,177 B2 * | 6/2006 | Carley ...................... 702/179 |
| 7,096,315 B2 * | 8/2006 | Takeda et al. .............. 711/111 |
| 7,127,555 B2 * | 10/2006 | Takeda et al. .............. 711/111 |
| 7,155,641 B2 * | 12/2006 | Prang et al. .................. 714/47 |
| 7,203,944 B1 * | 4/2007 | van Rietschote et al. .... 718/104 |
| 7,228,371 B2 * | 6/2007 | Schneider .................. 710/104 |
| 2002/0129338 A1 * | 9/2002 | MacDonell ................ 717/126 |
| 2002/0196744 A1 * | 12/2002 | O'Connor .................. 370/254 |
| 2003/0050794 A1 * | 3/2003 | Keck ............................. 705/2 |
| 2003/0069773 A1 * | 4/2003 | Hladik et al. ................. 705/7 |
| 2004/0006603 A1 * | 1/2004 | Haury ....................... 709/207 |
| 2004/0088314 A1 * | 5/2004 | Simes ....................... 707/102 |
| 2004/0107010 A1 * | 6/2004 | King ............................ 700/17 |
| 2004/0148285 A1 * | 7/2004 | Hurd et al. ..................... 707/9 |
| 2004/0205452 A1 * | 10/2004 | Fitzsimons et al. .......... 715/500 |
| 2005/0086554 A1 * | 4/2005 | Simes ......................... 714/4 |
| 2005/0097517 A1 * | 5/2005 | Goin et al. ................. 717/124 |

* cited by examiner

Primary Examiner—Don Wong
Assistant Examiner—Thanh-Ha Dang

(57) ABSTRACT

The present invention provides a method of collecting system performance metrics from a plurality of monitored systems and reporting system performance metrics to a requesting client system. In accordance with the present invention, the system performance metrics are collected to a database so that requesting client systems requiring the metrics need not have access to each monitored system. The monitored systems may limit user access and maintain system security while still providing the metrics required to address system availability and load problems.

16 Claims, 6 Drawing Sheets

SYSTEM AND METHOD OF COLLECTING AND REPORTING SYSTEM PERFORMANCE METRICS

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates to collecting and reporting system performance metrics. More particularly, the present invention relates to collecting and reporting system performance metrics by collecting the metrics to a central database and reporting the collected metrics to a requesting client system so that the requesting client system does not require access to the monitored systems.

BACKGROUND OF THE INVENTION

Computing systems have become an integral part of business, government, and most other aspects of modern life. Most people are likely regrettably familiar with poor performing computer systems. A poor performing computer system may be simply poorly designed and, therefore, fundamentally incapable of performing well. Even well-designed systems will perform poorly, however, if inadequate resources are not available to meet the demands placed upon the systems. Properly matching the resources available to a system with the demand placed upon the system requires both accurate capacity planning and adequate system testing to predict the resources that will be necessary for the system to function properly at the loads expected for the system. Additionally, after the system is in production, continual monitoring of capacity and load metrics validates the pre-production planning while also indicating when more resources are required.

Measuring the load that is placed upon a system may involve a number of issues, and this measurement may be performed in a variety of ways. For example, system performance metrics such as system availability and load may be tracked continuously or periodically during operation by software or hardware-based measurement mechanisms. Most of these mechanisms reside on the monitored system and thus require system access by a user who would like to view the system performance metrics.

Due to system security concerns, it may be undesirable to allow all users to access all monitored systems in order to view and report system performance metrics. It is often difficult to limit security access to only allow reporting system metrics without permitting the user to access other data and applications residing on the monitored system. By permitting a user to report system metrics from a database, security access to monitored systems is not required.

SUMMARY OF THE INVENTION

The current invention addresses the need to make system performance metrics available to a large number of requesting client systems without compromising the security of the monitored systems. By collecting the system performance metrics to a central repository, the invention presents the requesting client system with one location, and thus one system access, to retrieve all system and load measurements of interest.

The present invention provides a system and method to collect system performance metrics from a plurality of monitored systems. The system then presents an interface to the requesting client system to query a database and to deliver the resulting system performance metrics to the requesting client system.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

The present invention provides a system and methods for collecting and reporting system performance metrics from monitored systems, wherein a system comprises computer software operating on computer hardware. Examples of system performance metrics are measurements such as availability (up-time) and load for a particular system, CPU, memory and disk utilization measurements as well as resource consumption by application. The present invention may be used to collect and report system performance metrics of a plurality of monitored systems. One example of such a system is an order processing system that receives orders input into a user interface, processes that information, and then provides pertinent information to persons or systems responsible for filling the orders. However, any system comprising software operating on hardware may be subject to the collecting and reporting methods within the present invention as long as there exists a mechanism to gather the system performance metrics for the monitored system.

One skilled in the art will appreciate that a variety of methods, procedures, techniques, and protocols exist or may be developed for system monitoring, and that any of these may be used to monitor a system operating in its production environment to obtain system performance metrics for use in accordance with the present invention. Some examples of system performance monitoring software are TeamQuest Collector, Openview Performance Agent and BMC patrol.

Figure 1:
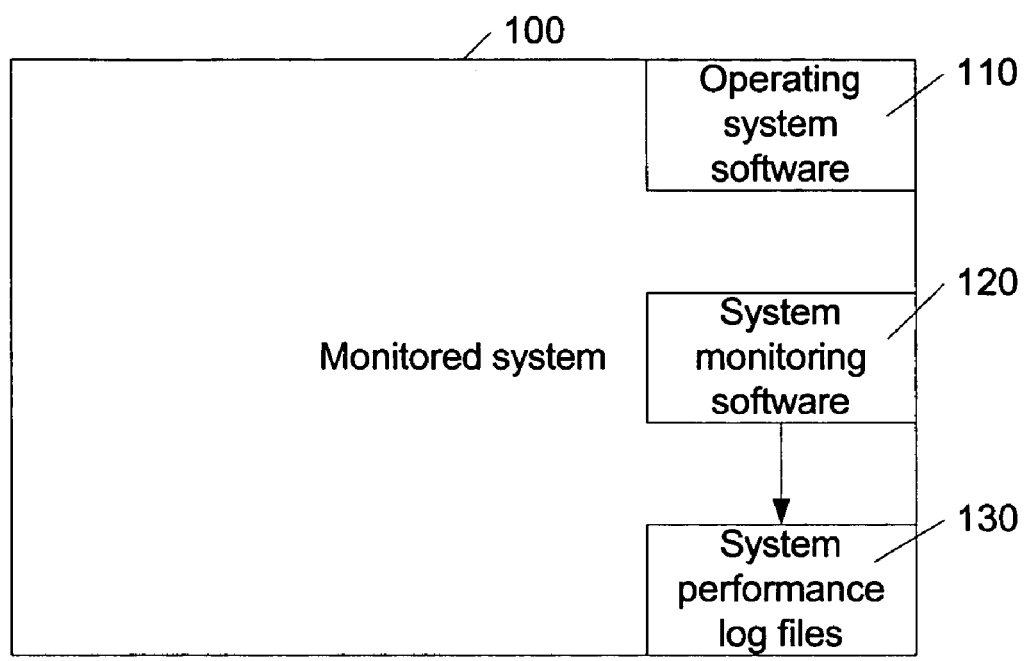
FIG. 1 illustrates the components of a monitored system.

FIG. 1 describes the components comprising a monitored system 100. Each monitored system 100 has operating system software 110 installed. Operating system software is the foundation software for a computer system that manages hardware such as storage, memory and peripherals. This operating system software can be one of many options such as Microsoft Windows, Hewlett-Packard HP-UX, Sun Solaris, IBM AIX, or Linux. Also present on monitored system 100 is system monitoring software 120 which measures system performance metrics and stores the resulting metrics in system performance log files 130 on the system. System monitoring software 120 could be any of a number of solutions to monitor system performance metrics such as load and availability such as TeamQuest.

Figure 2:
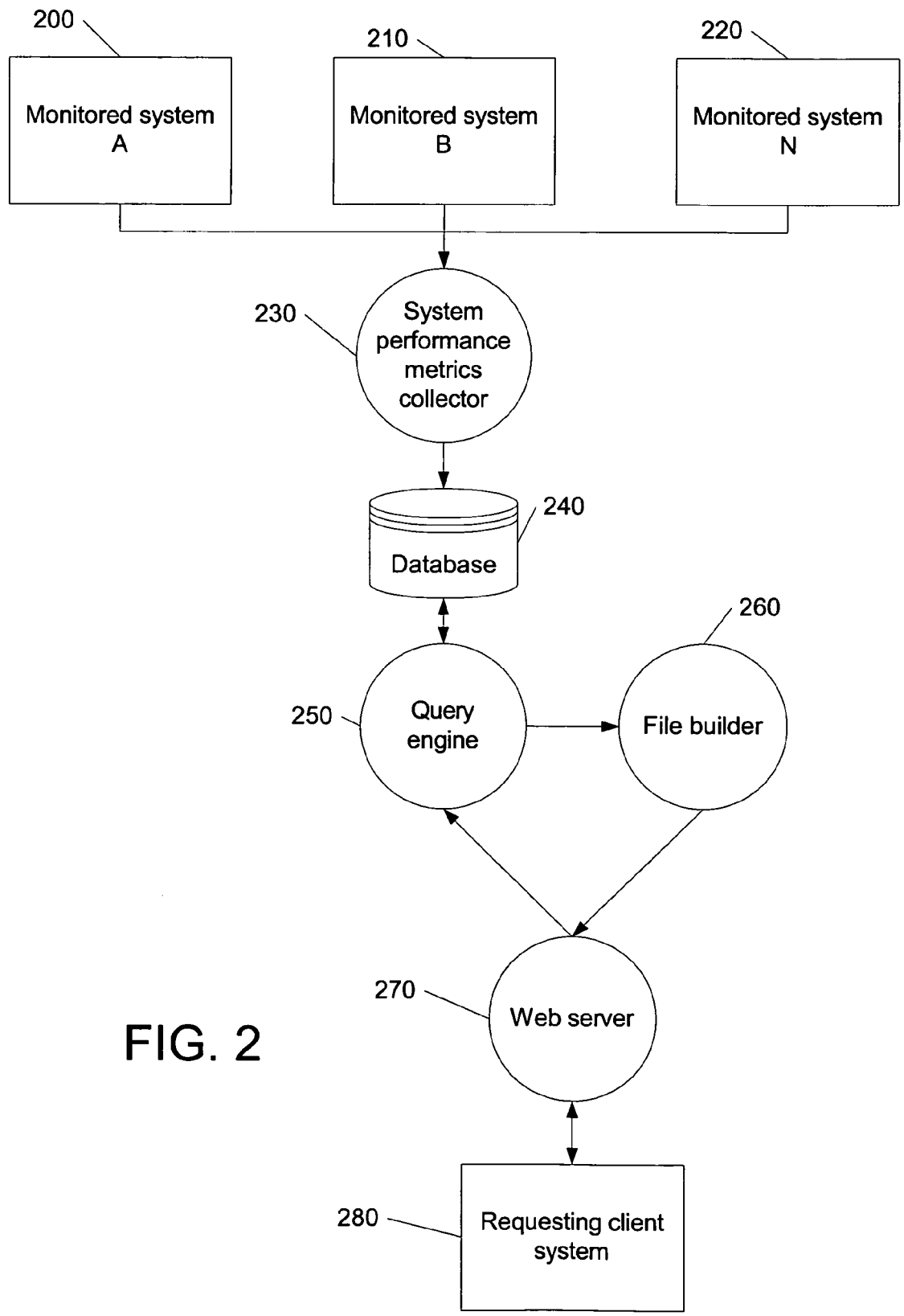
FIG. 2 illustrates a computing architecture for implementing the present invention.

FIG. 2 illustrates a computing architecture for implementing the present invention. FIG. 2 is composed of a plurality of monitored systems of the form described in FIG. 1 as monitored system 100. A plurality of monitored systems are depicted within FIG. 2 as monitored system A 200, monitored system B 210, and monitored system N 220 where N is any number of systems that can be connected on the network. A system performance metrics collector process 230 collects system performance metrics from each of the monitored systems 200, 210 and 220. After collecting the metrics, collector process 230 stores the system performance metrics to a database 240. The requesting client system 280 sends a request for a report of system performance metrics through the web server process 270 to the query engine process 250. Query engine process 250 creates the database query required to service the request from requesting client system 280 and executes the resulting query against database 240. Database 240 responds to query engine process 250 with the system performance metrics resulting from the query. The resulting metrics are passed to the file builder process 260 to compose the required file format. The file created by file builder process 260 is passed through web server 270 to requesting client system 280. The various processes (collector process 230, web server process 270, query engine process 250 and file builder process 260) may exist on a single or a plurality of separate systems as is convenient for the particular implementation.

Figure 3:
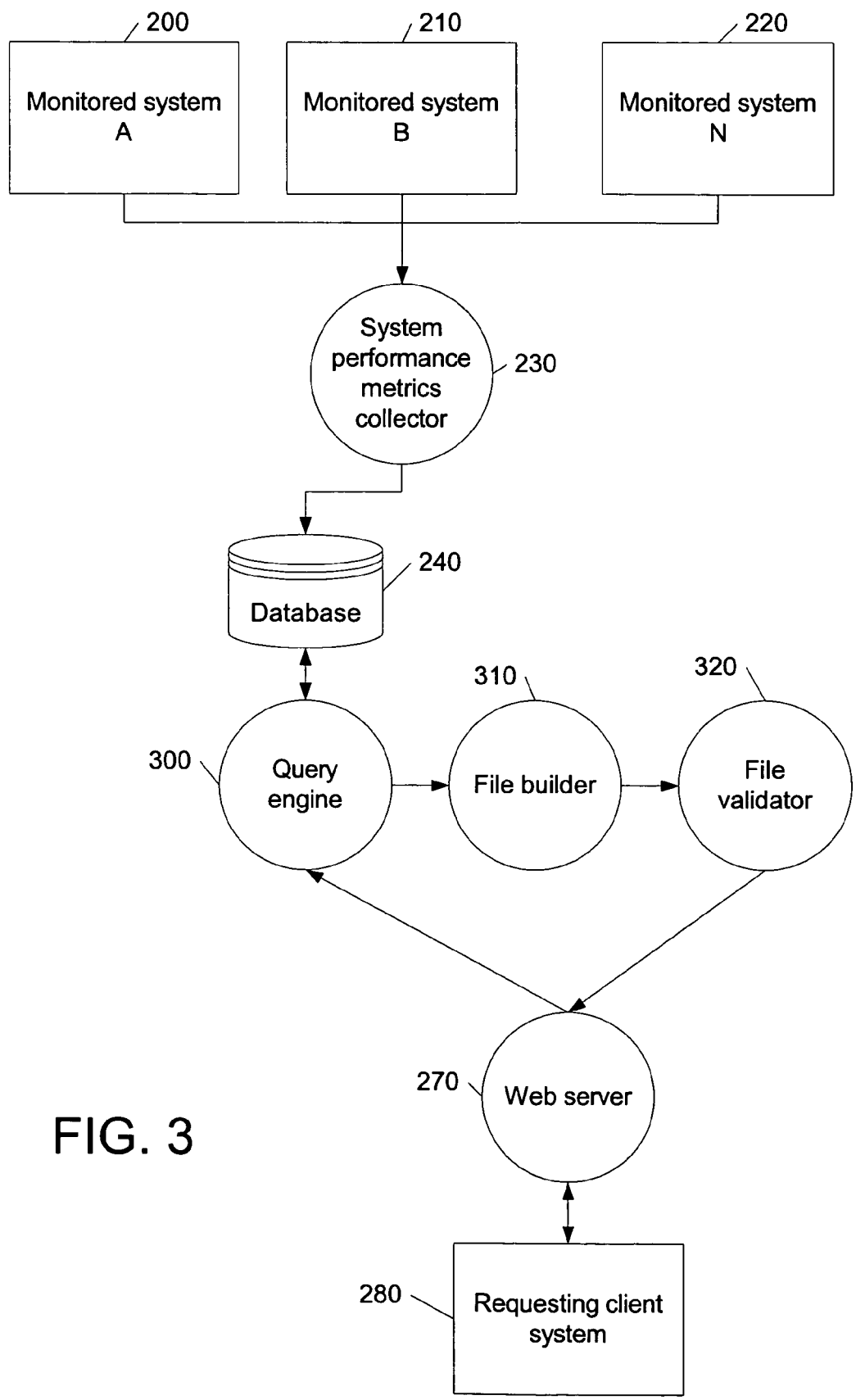
FIG. 3 illustrates a further computing architecture for implementing the present invention.

Referring now to FIG. 3, a further computing architecture for implementing the present invention is described. Again, the plurality of monitored systems are represented as monitored system A 200, monitored system B 210, and monitored system N 220 where N is any number of systems that can be connected on the network. System performance metrics collector process 230 collects system performance metrics from each of monitored systems 200, 210 and 220. After collecting the metrics, collector process 230 stores the system performance metrics to database 240. Requesting client system 280 sends a request for a report of system performance metrics through web server process 270 to query engine process 300. Query engine process 300 creates the database query required to service the request from requesting client system 280 and executes the resulting query against database 240. Database 240 responds to query engine process 300 with the system performance metrics resulting from the query. The resulting metrics are passed to file builder process 310 to compose the required file format based on the operating system software installed on the specific monitored system. The file created by the file builder process 310 is passed to a file validator process 320 to ensure the format of the file is accurate according to the operating system installed on the specific monitored system. The file is then passed through web server process 270 to requesting client system 280. The various processes (collector process 230, web server process 270, query engine process 300, file builder process 310, and file validator process 320) may exist on a single or a plurality of separate systems as is convenient for the particular implementation.

Figure 4:
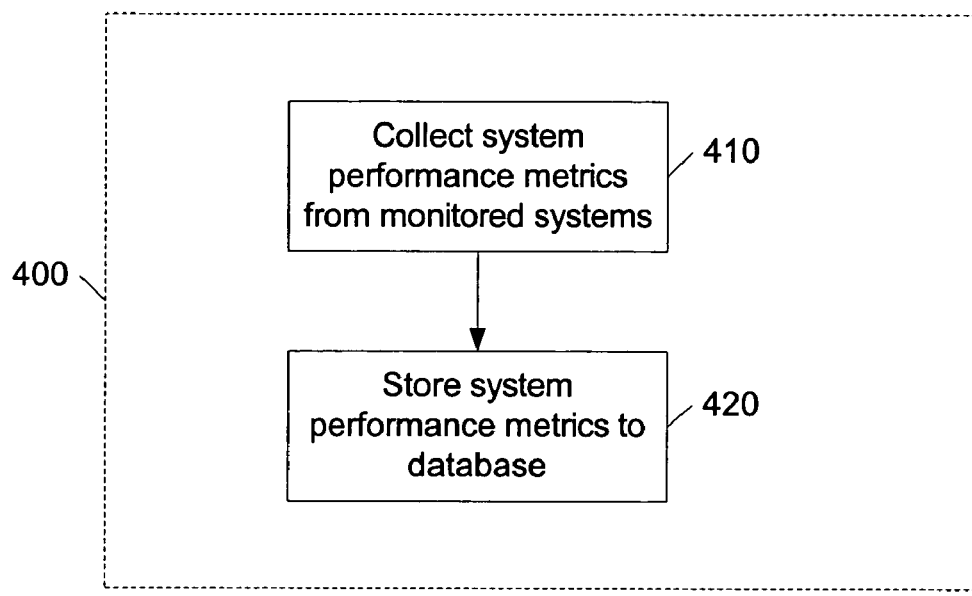
FIG. 4 illustrates a method in accordance with the present invention for collecting system performance metrics from monitored systems and storing the system performance metrics to a database.

Referring now to FIG. 4 a method 400 in accordance with the present invention for collecting system performance metrics is illustrated. The initial step 410 in collecting system performance metrics is to collect system performance metrics from monitored systems. The next step 420 is to store system performance metrics to a database.

Figure 5:
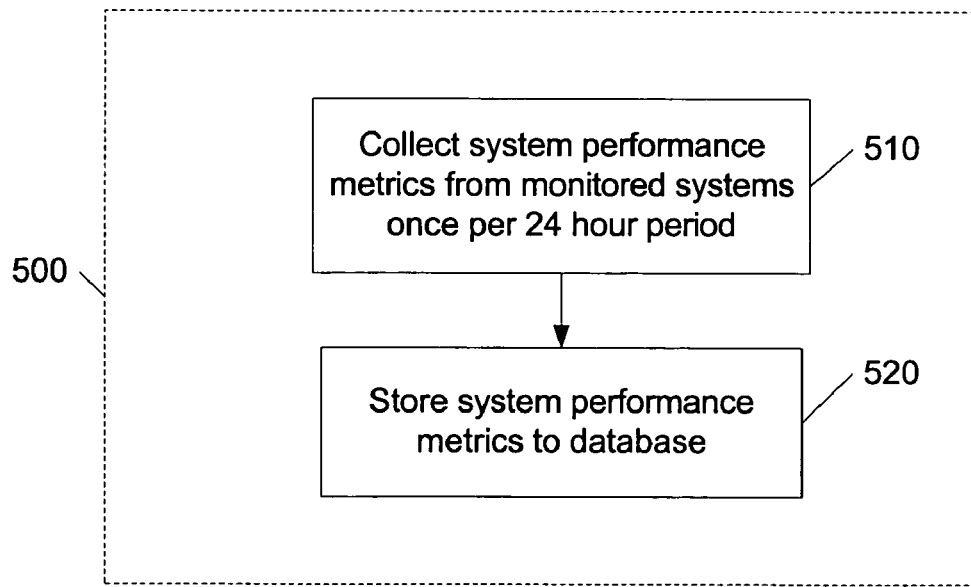
FIG. 5 illustrates a further method in accordance with the present invention for collecting system performance metrics from monitored systems and storing the system performance metrics to a database.

Referring now to FIG. 5 a further method 500 in accordance with the present invention for collecting system performance metrics is illustrated. The initial step 510 in collecting system performance metrics is to collect system performance metrics from monitored systems once per twenty-four hour period. The next step 520 is to store system performance metrics to a database.

While the current embodiment collects system performance metrics once per twenty-four hour period, it is reasonable to assume the periodicity could be easily configured to once per hour period, or even once per minute. The limiting factors for increasing the periodicity of the collection may include storage space within the database, the storage time after which records are purged from the database, and the time required to collect all system performance metrics once from each monitored system.

Figure 6:
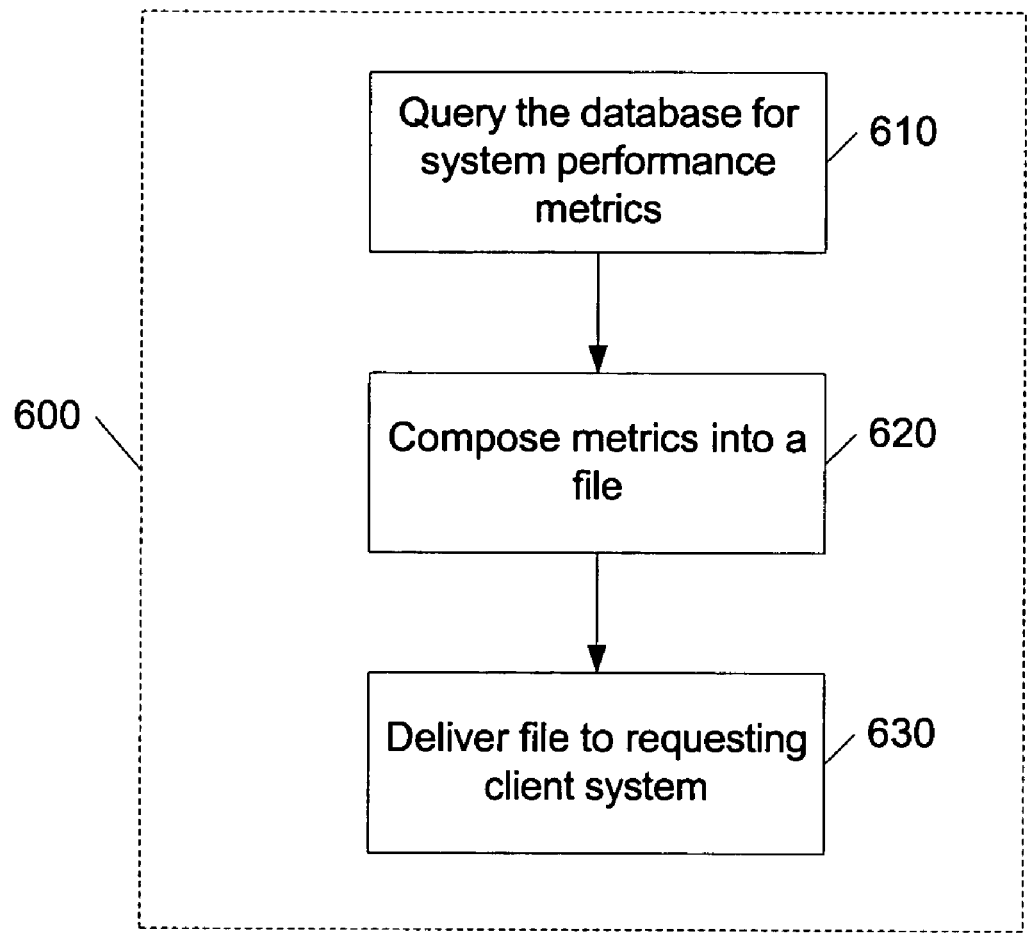
FIG. 6 illustrates a method in accordance with the present invention for reporting system performance metrics from a database to a requesting client system.

Referring now to FIG. 6 a method 600 in accordance with the present invention for reporting system performance metrics is illustrated. The initial step 610 in reporting system performance metrics is to query the database for system performance metrics when the request is sent from the requesting client system. The second step 620 is to compose metrics into a file. The third step 630 is to deliver file to requesting client system. This delivery function may be accomplished via any number of methods including Internet file transfer, email, or web page display.

Figure 7:
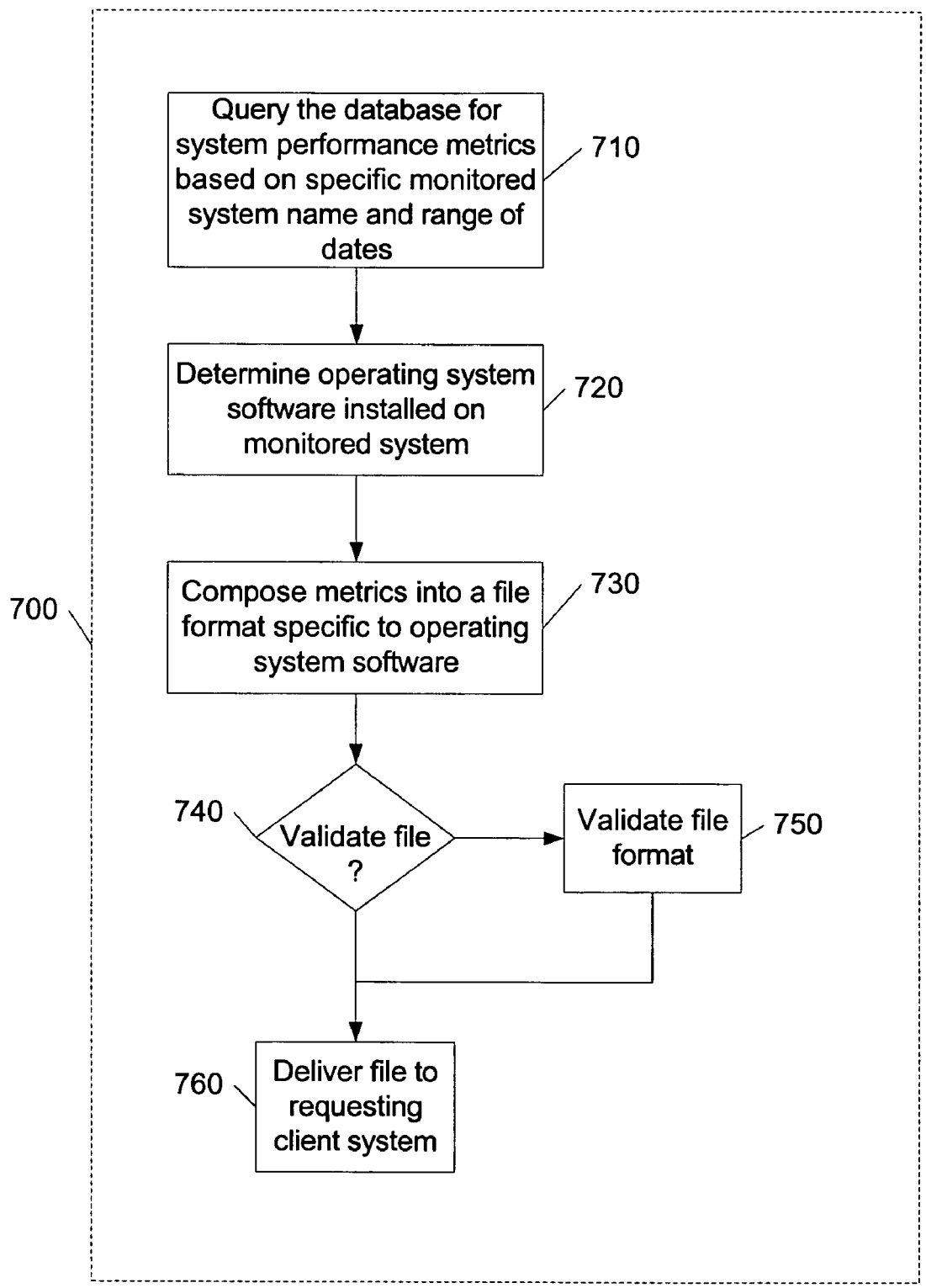
FIG. 7 illustrates a further method in accordance with the present invention for reporting system performance metrics from a database to a requesting client system.

Referring now to FIG. 7 a further method 700 in accordance with the present invention for reporting system performance metrics is illustrated. The initial step 710 in reporting system performance metrics is to query the database for system performance metrics based on specific monitored system name and range of dates when the request is sent from the requesting client system. The second step 720 is to determine operating system software installed on monitored system. This step could be performed by any of a number of mechanisms such as a real-time query to the monitored system or a look-up in a database inventory of monitored systems. The third step 730 is to compose metrics into a file format specific to operating system software as determined by the requirements of a modeling software external to this system that uses the metrics file as an input. At this point, a decision is made as to whether to validate file 740 or proceed without validation based again on the requirements of a modeling software external to this system that uses the metrics file as an input. In the option to validate file, the next step 750 is to validate file format followed by an additional step 760 to deliver file to requesting client system. If the decision is to not validate the file, the method flows from the validate file decision 740 to the next step 760 to deliver file to requesting client system. This delivery function may be accomplished via any number of methods including Internet file transfer, email, or web page display.

The current invention provides reporting for a single monitored system per query. A requesting client system could request reports for a plurality of monitored systems each using the same or different operating system software. It is also foreseeable that the requesting client system could request a report of monitored systems located at a particular location.

While the present invention is not limited to any particular programming language or system monitoring application, it has been particularly implemented with TeamQuest application, Open View Performance Agent (OVPA) software, and Perl programming language with an Oracle database.

The invention claimed is:

1. A method for collecting system performance metrics from a plurality of monitored systems and reporting the collected metrics to a requesting client system comprising:
   collecting the system performance metrics from the plurality of monitored systems;
   storing the collected system performance metrics to a database;
   receiving query parameters from the requesting client system;
   querying the database for the collected system performance metrics, using the received query parameters;
   composing resulting system performance metrics into a file that is configured with a format specific to a type of operating system software utilized by a modeling software external to the plurality of monitored systems that receives the file as an input;
   determining whether to validate the file based on requirements of the external modeling software;
   when validation is required, validating whether the format of the file is accurate according to an operating system installed on the plurality of monitored systems; and
   when no validation is required, proceeding without validation and delivering the file to the requesting client system.

2. The method for collecting system performance metrics from a plurality of monitored systems and reporting the collected metrics to a requesting client system of claim 1 where composing data into the file comprises determining the operating system software installed on the plurality of monitored systems by performing a real-time query of the plurality of monitored systems.

3. The method for collecting system performance metrics from a plurality of monitored systems and reporting the collected metrics to a requesting client system of claim 1 where collecting system performance metrics from a plurality of monitored systems occurs on a periodic basis.

4. The method for collecting system performance metrics from a plurality of monitored systems and reporting the collected metrics to a requesting client system of claim 3 where the periodic basis is once per twenty-four hour period.

5. The method for collecting system performance metrics from a plurality of monitored systems and reporting the collected metrics to a requesting client system of claim 1 where the received query parameters include the name of a specific monitored system of the plurality of monitored systems and a range of dates.

6. The method for collecting system performance metrics from a plurality of monitored systems and reporting the collected metrics to a requesting client system of claim 1 where collecting system performance metrics from the plurality of monitored systems on a periodic basis comprises collecting the system performance metrics from log files created by system monitoring software present on each of the plurality of monitored systems.

7. The method for collecting system performance metrics from a plurality of monitored systems and reporting the collected metrics to a requesting client system of claim 1 where composing resulting system performance metrics into the file further comprises determining input requirements of the modeling software external to the plurality of monitored systems.

8. The method for collecting system performance metrics from a plurality of monitored systems and reporting the collected metrics to a requesting client system of claim 7 where delivering the file further comprises transferring the file to an external computing device having the modeling software embedded thereon, the modeling software adapted to utilize the file for modeling the plurality of monitored systems.

9. A computer system for collecting system performance metrics from a plurality of monitored systems and reporting a subset of the collected system performance metrics to a requesting client system, the computer system comprising:
   a processor coupled to a computer storage medium, the computer storage medium having stored thereon a plurality of computer software components executable by the processor, the computer software components comprising:
   a collection component interfacing with the plurality of monitored systems to collect the system performance metrics;
   a database containing the collected system performance metrics;
   a query engine to form a database query from a plurality of query parameters provided by the requesting client system and executing the database query on the collected system performance metrics stored in the database;
   a file builder component to build a file containing results of the database query, wherein building a file comprises composing metrics within the results of the database query into a format specific to a type of operating system software utilized by a modeling software external to the plurality of monitored systems that receives the file as an input;
   a file validator to determine whether the format of the file is accurate according to an operating system installed on the plurality of monitored systems; and
   a delivery component to deliver the file to the requesting client system.

10. The computer system of claim 9 where the file builder further comprises a component to determine the operating system software installed on the plurality of monitored systems by performing a real-time query of the plurality of monitored systems.

11. The computer system of claim 9 wherein the collection component collects the system performance metrics on a periodic basis.

12. The computer system of claim 11 where the periodic basis is once per twenty-four hour period.

13. The computer system of claim 9 where the plurality of query parameters include a system name of a specific monitored system of the plurality of monitored systems and a range of dates.

14. The computer system of claim 9 where the collection component interfacing with the plurality of monitored systems to collect the system performance metrics on a periodic basis collects the system performance metrics from log files created by system monitoring software present on each of the plurality of monitored systems.

15. The computer system of claim 9 where the file builder component is further configured to determine input requirements of the modeling software external to the plurality of monitored systems.

16. The computer system of claim 15 where the delivery component is further configured to transfer the file to an external computing device having the modeling software embedded thereon, the modeling software adapted to utilize the file for modeling the plurality of monitored systems.

* * * * *